(No Model.) 2 Sheets—Sheet 2.
R. THOMSON.
CAR FENDER.
No. 538,982. Patented May 7, 1895.
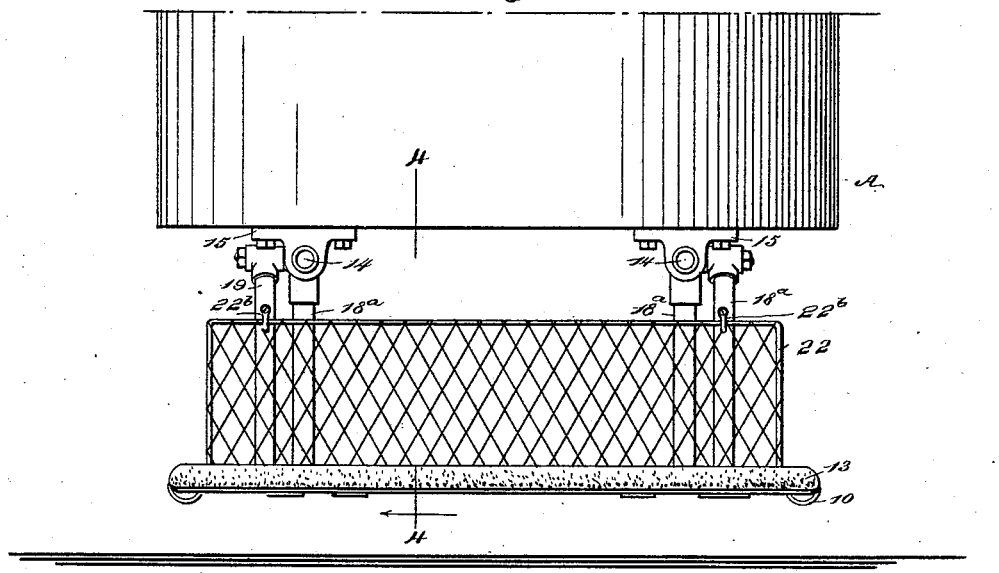
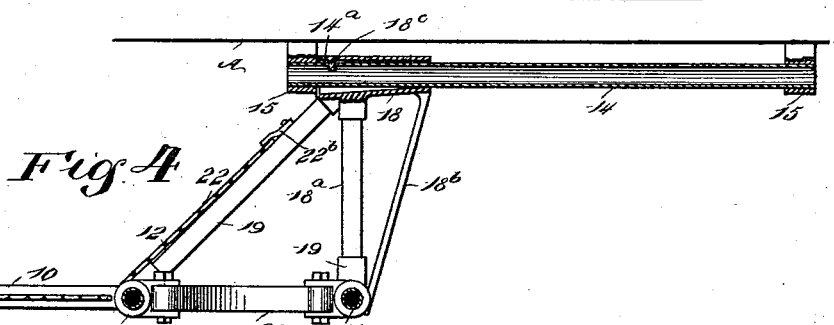
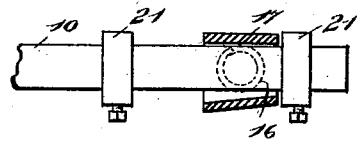
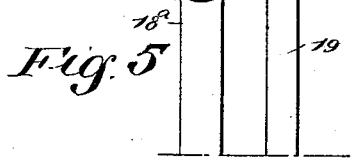
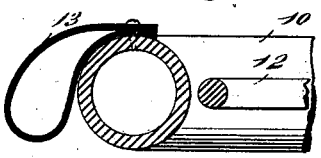
WITNESSES:
Joshua Bergstrom
Wm. P. Patton
INVENTOR
R. Thomson
BY
Munn & Co
ATTORNEYS.

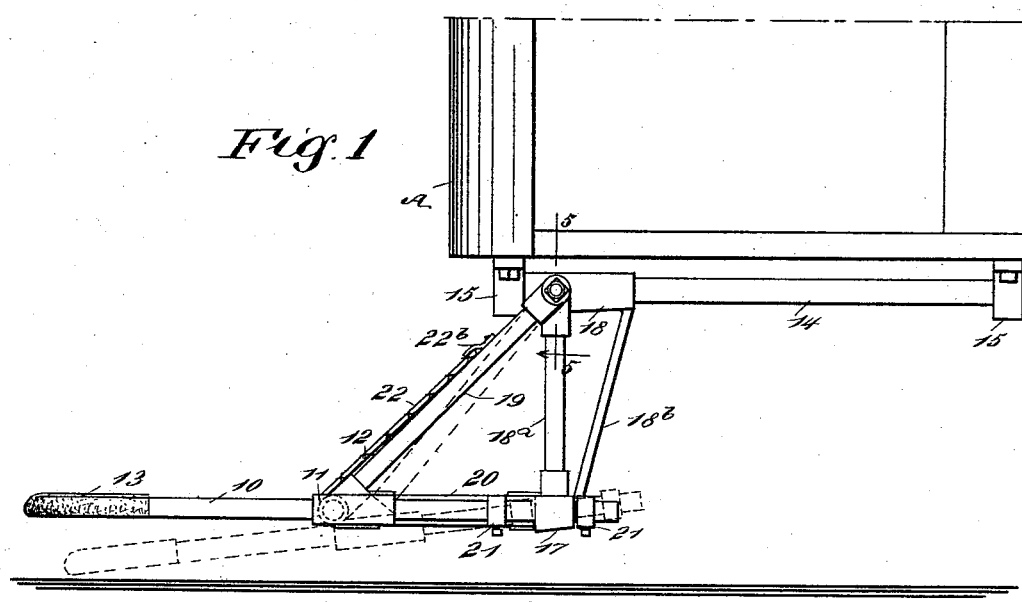

UNITED STATES PATENT OFFICE.

ROBERT THOMSON, OF BROOKLYN, NEW YORK, ASSIGNOR OF ONE-FOURTH TO JOSEPH NORWOOD, OF SAME PLACE.

CAR-FENDER.

SPECIFICATION forming part of Letters Patent No. 538,982, dated May 7, 1895.

Application filed October 12, 1894. Serial No. 525,670. (No model.)

*To all whom it may concern:*

Be it known that I, ROBERT THOMSON, of Brooklyn, in the county of Kings and State of New York, have invented certain new Improvements in Car-Fenders, of which the following is a full, clear, and exact description.

My invention relates to improvements in car fenders, and has for its object to improve the construction of the car fender patented by me August 21, 1894, and numbered 524,918. The said patented car fender in brief, consists of a frame that is protected at the front with an elastic cushion, and is covered with a yielding netting, said frame being hung from standards that are detachably connected with the end portion of the car frame.

The frame is provided with plate springs that are adapted to yield rearwardly and downwardly, when struck by a heavy body, as for instance, a person on the track over which the car is moving, this feature of construction being the most important, there being other minor features in the patented device that it is not necessary to mention in connection with the improvements that are hereinafter described.

The object of my present invention is to provide simple and reliable means for supporting a car fender constructed substantially as represented in my patented fender hereinbefore briefly described, so that the fender may be conveniently slid longitudinally on the car, and be located either beneath the car body or its platform, or be projected in advance of the latter, and be automatically locked when it is adjusted to project it or to locate it beneath the car, as stated.

A further object is, to construct a portion of the yielding covering of the fender frame so that it may be folded flat on the main portion of said covering, or be elevated and rearwardly inclined, to adapt it to act as a guard for preventing a body that falls on the fender from passing rearwardly over it; and a further object is, to provide a buffer cushion for the front of the fender frame, of a peculiar formation, which will be cheap to produce, and that will last longer than the usual tubular cushions provided for a like purpose.

To these ends, my invention consists in the construction and combination of parts, as hereinafter described and claimed.

Reference is to be had to the accompanying drawings, forming a part of this specification, in which similar figures and letters of reference indicate corresponding parts in all the views.

Figure 1 is a side view of the fender applied. Fig. 2 is a reversed plan view of the improvement on a car. Fig. 3 is a front elevation of the improved fender on a car, shown in part. Fig. 4 is a sectional side view on the line 4 4 in Fig. 3. Fig. 5 is an enlarged transverse sectional view of parts of the improvement on the line 5 5 in Fig. 1. Fig. 6 is an enlarged sectional side view of improved details of construction on the line 6 6 in Fig. 2, and Fig. 7 is an enlarged transverse sectional view of the forward portion of the fender on the line 7 7 in Fig. 2.

In the present construction of the improved device, there is a border frame 10, provided, which is rigid, and preferably constructed of tubular material that is bent to produce two parallel limbs and a forward transverse joining member for said limbs, the bends being curved to produce rounded corners, as shown in Fig. 2. A cross bar 11, is extended between the limbs of the frame 10, and is secured on them. Preferably, the bar 11 is formed of a pipe section, so as to render it light and strong, and as represented said cross bar has its junctions with the limbs of the frame formed with L-fittings, that are screwed on the ends of the tubular cross bar, and have an adjustable connection of their other open ended members with the frame limbs, to which they are secured at a proper point by set screws.

The portion of the frame 10 that is forward of the cross bar 11, is covered with woven wire fabric 12, that serves in use as a slightly yielding receiver net whereon a person struck by the fender will fall. A gum cushion 13, is attached to the transverse front portion of the frame 10, this part being preferably shaped tubular, and of a folded piece of gum fabric, as indicated in Fig. 7.

As the buffer cushion 13, can be made of gum cloth of proper thickness, by folding a strip of the material so as to bring two edges together and then securing the folded gum cloth on the top of the frame at the front, in a manner that will permit the folded fabric to hang pendent as shown, it will be seen that a cheap and practical buffer cushion is thus provided, which will prevent injury to the lower limbs of a person who may be struck by the fender.

The portions of the frame 10 that project at the rear of the cross bar 11, have sufficient length to adapt them to serve as arms for the connection of the frame with its support on the car A, which supporting devices contain essential features of improvement, and consist of the following described parts: Two similar guides 14, which are preferably formed of solid rods, are of tubing but may be made hung by suitable brackets 15, from the lower side of the car floor on the car frame, these guides being arranged longitudinally of the car and parallel with its sides and with each other.

A transverse carrier rod 16, has its ends in loose connection with the rear portions of the limbs that are parts of the frame 10. Preferably, the connections mentioned are formed as shown, consisting of similar T-shaped fittings 17, which are so secured on the extremities of the carrier rod, that the open tubular head members of these pieces will be adapted to slide on the frame limbs, the diameter of said head members being so proportioned that the frame 10 will be permitted to receive a limited vertical rocking movement, which construction of parts is clearly shown in Fig. 6.

The carrier rod 16 is hung from the guides 14, by two brackets of like construction, each comprising a sleeve piece 18, and two depending arms 18$^a$, 18$^b$. The arms 18$^a$ of the said brackets are made tubular to render them light and strong, and they are hung from points near the centers of length of the sleeves 18, at right angles to the same. The other arms 18$^b$, which serve as braces for the arms 18$^a$, extend diagonally between the lower ends of the latter and the rear ends of the sleeves, so as to add strength to the arms 18$^a$ and adapt the completed brackets to sustain the weight of the forwardly projected fender, and also of a person that may be thrown on the fender. Both of the arms 18$^a$, 18$^b$, on each bracket frame, converge at their lower ends, and unite with a transversely apertured box, which boxes are slid on the carrier rod 16, and are secured to the same by set screws, as shown in Fig. 2.

The connections between the fender frame 10 and the guides 14, further consist of two brace bars 19, which are pivotally secured to the sides of the sleeves 18, as is most clearly represented in Figs. 3 and 5, and from the sleeves project down and forward, their lower ends being firmly attached to the cross bar 11.

Between the carrier rod 16 and cross bar 11, two U-shaped plate springs 20, are introduced near the brace bars 19, and have their ends firmly shackled to the carrier rod and cross bar by suitable means, the disposition of the springs adapting them to cushion the force of a blow struck on the front edge of the fender frame 10, and also to serve as torsion springs, for the return of said frame to a level position, when it is relieved from imposed weight, the springs when unstained acting to maintain the frame horizontally and forwardly projected.

There are two adjustable collars 21, mounted on the rear portions of each side member of the frame 10, one of the collars being placed before and the other collar behind the T-shaped sleeve or fitting 17, at each end of the carrier rod 16. It is evident that an adjustment of the collars 21 will control the degree of vertical rocking movement that may be given to the fender frame, as the location of the front collars nearer to the end of the carrier rod 16 than is represented in Fig. 1, will prevent the frame 10 from being rearwardly slid and downwardly rocked to the extent indicated by dotted lines in said figure. A forward adjustment of the rear collars 21, will check the fender frame from assuming a horizontal plane, providing such an adjustment is made while the frame is pressed down at the front edge, so that it will be seen that the relative position of the fender proper with regard to the car track over which it is to travel, can be exactly regulated by means of the adjustable collars 21.

In the patented car fender that the present invention is to improve, a portion of the woven wire netting is upwardly and rearwardly inclined and supported in such a position, by its firm attachment to inclined braces at the sides of the fender. In the present improvement, it is found of advantage to provide means for changing the adjustment of the upright part of the netting that forms the yielding cover of the fender frame, so that said part may be folded on the top of the main portion of the fender.

To effect the adjustment mentioned, a border frame 22, that is covered with wire netting, is hinged as at 22$^a$ on the cross bar 11, which will permit the apron composed of the border frame and its cover, to be laid flat on the main portion of the fender, or be raised and rearwardly inclined so as to rest the ends of the frame 22 against the brace rods 19, to which said frame may be clamped by the turn-buttons 22$^b$.

An important feature of the improvement consists in the formation of the sleeves 18, so as to permit them to be rocked endwise on the guides 14, this being effected by giving the sleeves a tapering form, and arranging their end portions which have the greatest diameter, nearest the arms 18$^a$ of the brackets of which the sleeves form a part.

It will be seen that the coniform shape given to the sleeves 18, will with the similar shape given to the head members of the T-fittings 17, allow the fender and its depending supports to be vertically rocked on the guides 14; and the loose connection of the sleeves with the guides, will permit the fender complete to be slid on the guides, so as to place the fender beneath the car platform, or project the device in front of the latter.

Another feature of the invention consists in providing means to automatically lock the sleeves 18, to the guides 14, when the fender is shoved below the platform of the car, and also when the fender is drawn out so as to be in position for use. One convenient and simple device for the purpose just indicated, consists of a dowel pin 18°, provided for each sleeve 18, which pins are secured in the sleeves so as to project into their bores near their front ends, as shown in Fig. 4, these dowel pins being intended to enter perforations 14ª in the guides 14, said perforations having locations at a proper distance from the front and rear ends of the guides.

When it is desired to slide the fender on the guides 14, the front edge of the fender is lifted, which will so rock the brackets it is hung with, that the sleeves 18 of said brackets will be sufficiently raised at their front ends to detach the dowel pins 18° from the holes in the guides wherein they have been entered. This will allow the fender to be pushed beneath the car platform, and if the weight of the fender is partly thrown on the pins 18°, while the fender is sliding on the guides, said pins will enter the rear perforations 14ª in the guides, when opposite the same, which will lock the fender in place beneath the car or its platform.

To release the sleeves 18 from the guides when locked to them with the fender slid beneath the car platform, the front of the platform is lifted in the same manner as before explained, which will release the dowel pins, and allow the fender to be drawn outwardly.

The car fender as supported by the improved means that have been described, is rendered more practical, as it may be removed from an advanced position, and thus facilitate the housing of cars having the improved fender, in sheds or buildings that will only receive the cars, and which would require the complete detachment of the fenders at each end of the car if the improvement were not provided.

The patented car fender with the present improvements is particularly well adapted for effective service, as it when projected will if brought into contact with a person on the track over which the car is moving, yield to the shock of such a contact, by reason of the compression of the springs 20, that will at the same time allow the fender to rock downwardly within the range permitted by the collars 21, and in this way locate the front edge of the fender near to the track, which will insure the easy lifting of the person struck by the fender frame and the subsequent location of said person on the netting of the fender, the apron which in use of the fender is elevated, serving to prevent a person that is thrown on the main portion of the fender from passing off of it at the rear edge of the same.

The apron of which the frame 22 is a portion, is made to fold, as this permits the sliding movement of the fender to be effected in a space of comparatively little height, which is essential in cars of certain constructions that afford restricted space at their ends.

Having thus described my invention, I claim as new and desire to secure by Letters Patent—

1. In a car fender, the combination of a car having longitudinal guides, brackets mounted to slide on the guides and a fender mounted to slide in said brackets parallel to the movement of the brackets on said longitudinal guides, substantially as set forth.

2. In a car fender, the combination of a car, a fender having a yielding cover and provided at its rear part with rearwardly inclined supports connected at their upper ends to the car, and a pivoted folding apron adapted to be arranged on said supports in an inclined position, substantially as set forth.

3. The combination, with a forwardly spring-pressed car fender frame, of supports on the car loosely engaging the side limbs of the fender frame, and adjustable collars on said limbs located at each side of the supports, and adapted to control the rearward and rocking movement of the fender frame, substantially as described.

4. The combination, with a car fender frame comprising a substantially U-shaped border piece and a cross bar secured on the limbs of said border piece, the ends of said limbs projecting behind the cross bar, of a carrier rod loosely mounted on the rearward projections of said limbs, U-shaped springs secured at their ends between the cross bar and carrier rod, hanger brackets having their lower ends adapted to rock on the rearward projections of the frame limbs, adjustable collars for each of said limbs, limiting the sliding movement of the brackets thereon, and guides on the car loosely engaged by the upper portions of the hanger brackets, substantially as described.

5. In a car fender the combination of a car having brackets, a forwardly extending fender having limbs at opposite sides, sleeves mounted on the brackets in position to receive the limbs of the fender, said sleeves having a greater width than the limbs of the fender whereby the latter are permitted to rock and slide therein, a spring for holding said fender normally raised and pressed forward in the sleeves of the brackets and means for limiting the sliding movement of the fender, substantially as set forth.

6. In a car fender, the combination of a car having a longitudinal guide, a bracket mounted to slide on the guide, a fender mounted to slide on the bracket and a spring to hold the fender normally pressed forward, substantially as set forth.

7. In a car fender, the combination of a car having brackets provided with guides, a fender mounted in and having less width than said brackets and being adapted to rock and slide therein, said car fender being normally held pressed forward in an elevated position, and supports pivoted at their upper ends to the car and connected to the forward part of the fender, substantially as set forth.

ROBERT THOMSON.

Witnesses:
WM. P. PATTON,
JNO. M. RITTER.